US005524341A

United States Patent [19]
Ferleger et al.

[11] Patent Number: 5,524,341
[45] Date of Patent: Jun. 11, 1996

[54] METHOD OF MAKING A ROW OF MIX-TUNED TURBOMACHINE BLADES

[75] Inventors: Jurek Ferleger, Longwood; Douglas C. Hofer, Orlando, both of Fla.

[73] Assignee: Westinghouse Electric Corporation, Pittsburgh, Pa.

[21] Appl. No.: 312,419

[22] Filed: Sep. 26, 1994

[51] Int. Cl.$^6$ .................................................. B23P 15/00
[52] U.S. Cl. .................. 29/889.7; 29/889.21; 29/889.22
[58] Field of Search ............................ 29/889.7, 889.21, 29/889.22; 416/228, 203, 175, 500; 415/119, 172 A

[56] References Cited

U.S. PATENT DOCUMENTS

| | | | |
|---|---|---|---|
| 2,934,259 | 4/1960 | Hausmann | 230/122 |
| 3,333,817 | 8/1967 | Rhomberg | 253/77 |
| 4,533,298 | 8/1985 | Partington et al. | 416/191 |
| 4,626,174 | 12/1986 | Sato et al. | 416/223 |
| 4,695,228 | 9/1987 | Purcaru | 416/223 |
| 4,878,810 | 11/1989 | Evans | 416/203 |
| 4,900,230 | 2/1990 | Patel | 416/223 |
| 4,919,593 | 4/1990 | Brown | 416/223 |
| 5,035,578 | 5/1991 | Tran | 416/223 |
| 5,088,894 | 2/1992 | Patel | 416/219 |
| 5,192,190 | 3/1993 | Ferleger et al. | 415/191 |
| 5,203,676 | 4/1993 | Ferleger et al. | 416/223 |
| 5,211,703 | 5/1993 | Ferleger et al. | 415/181 |
| 5,221,181 | 6/1993 | Ferleger et al. | 415/181 |
| 5,277,549 | 1/1994 | Chen et al. | 416/223 |
| 5,352,092 | 10/1994 | Ferleger et al. | |

*Primary Examiner*—Irene Cuda
*Attorney, Agent, or Firm*—M. G. Panian

[57] ABSTRACT

A row of mix-tuned rotor blades for use in a turbomachine in which the first mode vibratory frequency of each of the blades falls into either of two distinct groups. The blades from the first group alternate with the blades from the second group so that no two adjacent blades have the same frequency, thereby inhibiting the onset of stall flutter. The blades are made by forging a forging blank between upper and lower die halves. The orientation of the upper die half relative to the lower die half when the die is fully closed is different depending on whether blades are being made for the first or second group, the difference being an offset in the position of the upper die half. As a result, the airfoils of the blades in the first and second groups have slightly different shapes, thereby resulting in the difference in resonant frequency.

18 Claims, 5 Drawing Sheets

METHOD OF MAKING A ROW OF MIX-TUNED TURBOMACHINE BLADES

BACKGROUND OF THE INVENTION

The present invention relates to a row of blades for use in a turbo-machine. More specifically, the present invention relates to a row of blades having resonant frequencies that are mix-tuned so as to inhibit stall flutter vibration.

The flow path of an axial flow turbomachine, such as a steam turbine, is formed by a stationary cylinder and a rotor. A large number of stationary vanes are attached to the cylinder in a circumferential array and extend inward into the steam flow path. Similarly, a large number of rotating blades are attached to the rotor in a circumferential array and extend outward into the steam flow path. The stationary vanes and rotating blades are arranged in alternating rows so that a row of vanes and the immediately downstream row of blades form a stage. The vanes serve to direct the flow of steam so that it enters the downstream row of blades at the correct angle. The blade airfoils extract energy from the steam, thereby developing the power necessary to drive the rotor and the load attached to it.

The amount of energy extracted by each row of rotating blades depends on many factors, including the size and shape of the blade airfoils, as well as the quantity of blades in the row. Thus, the shapes of the blade airfoils are an extremely important factor in the thermodynamic performance of the turbine and determining the geometry of the blade airfoils is a vital portion of the turbine design.

As the steam flows through the turbine its pressure drops through each succeeding stage until the desired discharge pressure is achieved. Thus, the steam properties—that is, temperature, pressure, velocity and moisture content—vary from row to row as the steam expands through the flow path. Consequently, each blade row employs blades having an airfoil shape that is optimized for the steam conditions associated with that row.

Designing a steam turbine blade is made difficult by the fact that the airfoil shape determines, in large part, the mechanical strength of the blade and its resonant frequencies, as well as the thermodynamic performance of the blade. These considerations impose constraints on the choice of blade airfoil shape so that, of necessity, the optimum blade airfoil shape for a given row is a matter of compromise between its mechanical and aerodynamic properties.

During operation of a the turbine, the rotating blades are subject to forced vibration due to oscillatory excitation at frequencies which coincide with integer multiples, referred to as harmonics, of the rotor rotational frequency. Such excitation is referred to as synchronous excitation. Synchronous blade excitation can be created by non-uniformities in the flow of the motive fluid (i.e., steam in the case of a steam turbine) that may vary in space around the circumference of the turbine. Such non-uniformities result from the presence of such features as extraction pipes and reinforcing ribs, as well as imperfections in the shape and spacing of the stationary vanes.

As a result of the oscillatory excitation, turbine blades undergo high frequency deflections that create vibratory stresses in the blades. These vibratory stresses can result in high cycle fatigue cracking if their magnitude is not controlled. This problem is exacerbated by the fact that a turbine blade typically has a number of resonant frequencies associated with its various vibratory modes—i.e., tangential bending, axial bending, torsional, etc. If the frequency of the oscillatory excitation to which the blade is subjected is close to one of its resonant frequencies, the vibratory stresses can quickly build up to destructive levels. To avoid this occurrence, in turbines with rotors that are intended to operate at, or very near to, a single rotational frequency, the rotating blades are typically designed so that at least one, and preferably as many as possible, of the lower resonant frequencies do not coincide with harmonics of the rotor rotational frequency—typically referred to as "tuning." Traditionally, within a given row the blade airfoil shapes are identical, so that all of the blades are similarly tuned.

In contrast to forced vibration, a complex aerodynamic phenomenon known as stall flutter may occur even if the blades are properly tuned between two harmonics. Briefly, stall flutter is an aero-elastic instability wherein, under certain flow conditions, vibratory deflections in the airfoil cause changes in the aerodynamic loading on it that tend to increase, rather than dampen, the deflections. Consequently, stall flutter can increase the vibratory stress on the blade and cause high cycle fatigue cracking. Stall flutter may occur when two or more adjacent blades in a row vibrate at a frequency close to their natural resonant frequency for the first mode of vibration (i.e., tangential bending) and the vibratory motion between the two blades assumes a certain phase relationship.

One solution proposed in the past for increasing the resistance of the blade row to stall flutter is to form the row using blades of varying frequency—a method referred to as "mix-tuning." The mix-tuned blades are installed in the row so that each blade alternates with another blade having a slightly different resonant frequency. Such mix-tuning makes it more difficult for the blades to vibrate at the same frequency, thereby inhibiting stall flutter.

One method of achieving such mix-tuning involves profiling the tips of half of the blades in the row in order to modify their resonant frequency, as discussed in U.S. Pat. No. 4,878,810 (Evans), hereby incorporated by reference in its entirety. Unfortunately, such tip profiling increases manufacturing cycle time and is detrimental to thermodynamic performance.

It is therefore desirable to provide an alternate method for mix-tuning the blades in a turbomachine.

SUMMARY OF THE INVENTION

Accordingly, it is the general object of the current invention to provide a method for mix-tuning the blades in a turbomachine.

Briefly, this object, as well as other objects of the current invention, is accomplished in a method of making a row of airfoils for use in a turbomachine, each of the airfoils having a shape, comprising the steps of (i) forming a plurality of forging blanks, (ii) disposing a first one of the forging blanks between first and second portions of a die, the first and second die portions having first and second forming surfaces thereon, respectively, (iii) bringing the first die portion toward the second die portion so as to close the die, thereby forging the first forging blank disposed therebetween into a first one of the airfoils in the row, the first die portion being brought toward the second die portion so that the first die portion assumes a first orientation with respect to the second die portion when the die is closed, and (iv) disposing a second one of the forging blanks between the first and second portions of the die, and bringing the first die portion toward the second die portion so as to close the die, thereby forging the second forging blank disposed therebetween into a second one of the airfoils in the row, the first die portion being brought toward the second die portion so that the first die portion assumes a second orientation with respect to the second die portion when the die is closed, the first and second orientations of the first die relative to the second die differing by a predetermined amount.

In one embodiment of the method the first and second airfoils each have a resonant frequency, with the resonant frequency of the first airfoil differing from the resonant frequency of the second airfoil by a predetermined amount.

DESCRIPTION OF THE PREFERRED EMBODIMENT

Figure 1:
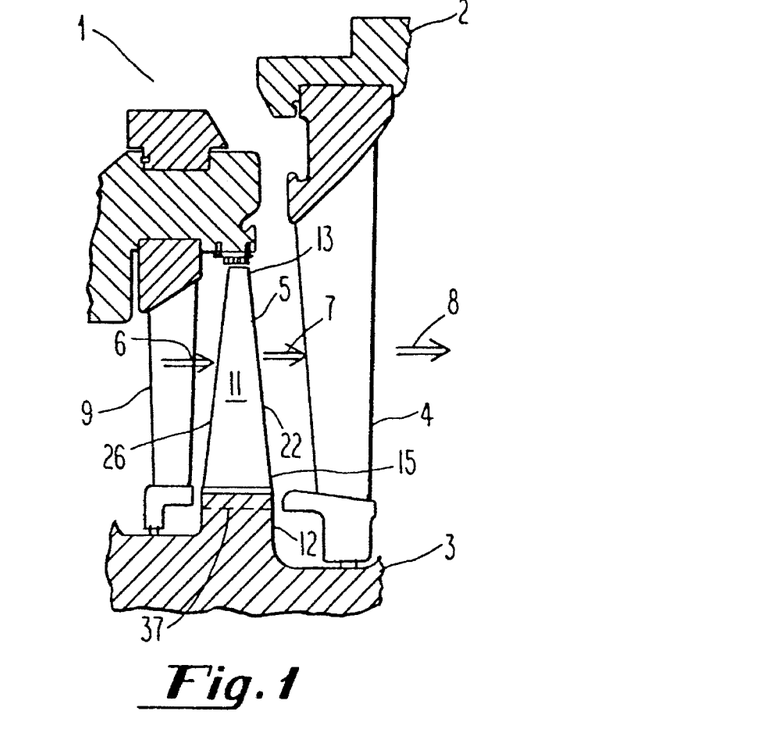
FIG. 1 is a portion of a cross-section through a steam turbine in the vicinity of a row of blades according to the current invention.

Referring to the drawings, there is shown in FIG. 1 a portion of a longitudinal cross-section through a low pressure steam turbine 1 in the vicinity of the first row of rotating blades. As shown, the steam flow path of the steam turbine 1 is formed by a stationary cylinder 2 and a rotor 3. A row of blades 5 are attached to the periphery of the rotor 3 and extend radially outward into the flow path in a circumferential array. A row of stationary vanes 9 of a segmental assembly are attached to the cylinder 2 and extend radially inward in a circumferential array immediately upstream of the row of blades 5. The vanes 9 have airfoils that cause the steam to undergo a portion of the stage pressure drop as it flows through the row of vanes. The vane airfoils 36 also serve to direct the flow of steam entering the stage so that the steam 6 enters the row of blades 5 at the correct angle. A second row of vanes 4 is disposed immediately downstream of the blades 5 and serves to direct the flow of steam 7 exiting the stage to the correct angle for the steam 8 that enters the following row of blades (not shown).

Figure 2:
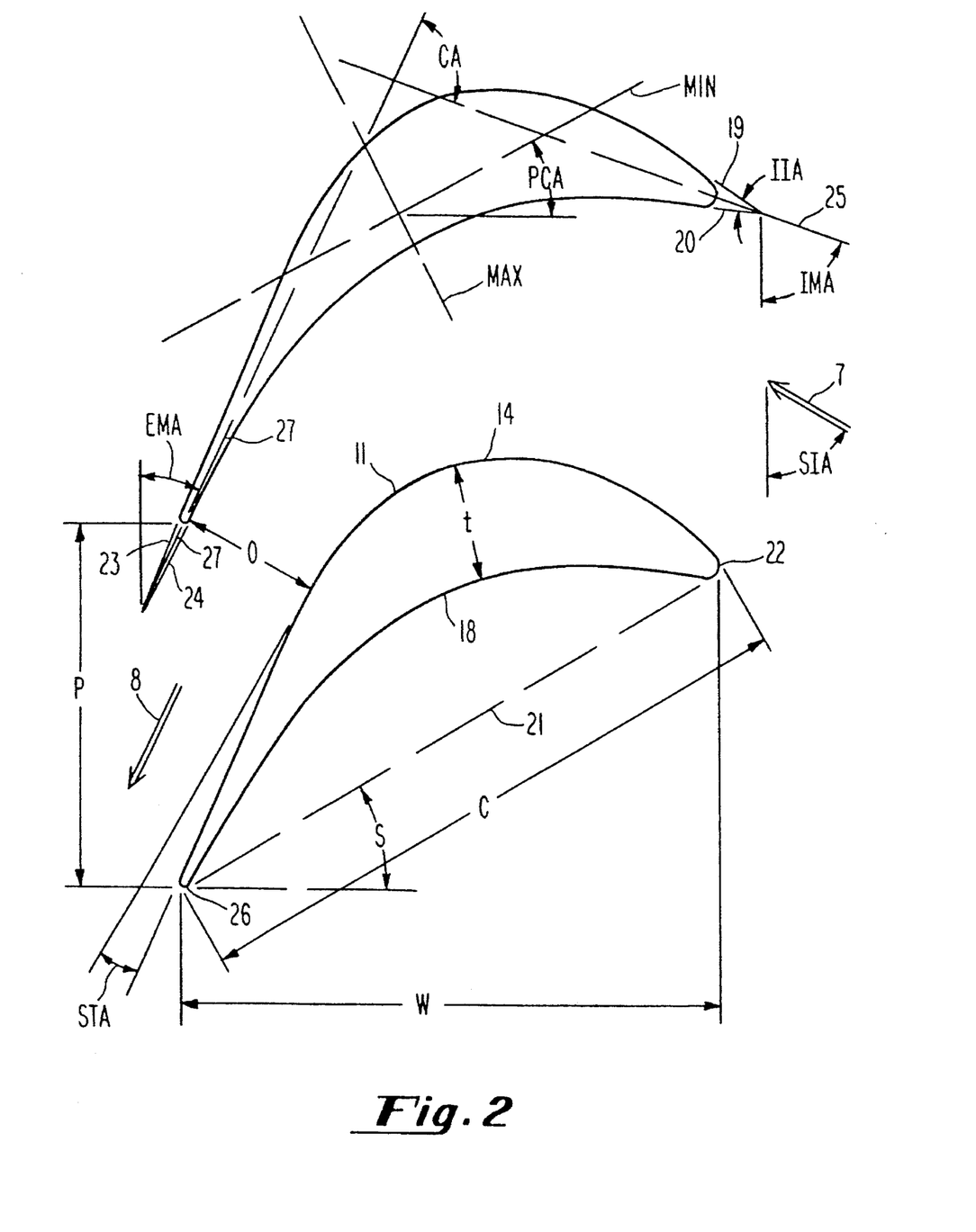
FIG. 2 is a schematic diagram of two adjacent steam turbine blades according to the current invention illustrating various performance related parameters.

As shown in FIG. 1, each blade 5 is comprised of an airfoil portion 11 that extracts energy from the steam 7 and a root portion 12 that serves to fix the blade to the rotor 3 via a groove 37 formed therein. The airfoil 11 has a base portion 15 at its proximal end adjacent the root 12 and a tip portion 13 at its distal end. As shown in FIG. 2, as is conventional, each airfoil 11 has a leading edge portion 22, a trailing edge portion 26, a convex suction surface 14 and a concave pressure surface 18. The novel geometry of the airfoil 11 for the blade of the current invention is specified in Tables I and II by the relevant parameters, each of which is discussed below (all angles expressed in degrees), and illustrated in FIGS. 2 and 3.

TABLE I

| Height | Aerodynamic Parameters | | | | | | |
|---|---|---|---|---|---|---|---|
|  | 0% | 14% | 28% | 38% | 60% | 80% | 100% |
| Radius, cm | 66.7 | 71.8 | 76.9 | 80.4 | 88.6 | 95.9 | 103 |
| Chord, cm | 11.1 | 10.3 | 9.6 | 9.1 | 8.5 | 8.4 | 8.5 |
| Pitch/width | 0.4 | 0.5 | 0.6 | 0.7 | 1.0 | 1.4 | 2.1 |
| Pitch/cord | 0.4 | 0.5 | 0.6 | 0.6 | 0.7 | 0.8 | 0.8 |
| Stagger angle | 14 | 19 | 25 | 30 | 45 | 58 | 66 |
| Gauging | 0.5 | 0.5 | 0.4 | 0.4 | 0.4 | 0.3 | 0.3 |
| Max. thk., mm | 18 | 16 | 16 | 17 | 11 | 8 | 5 |
| Camber angle | 102 | 99 | 92 | 89 | 77 | 52 | 15 |
| Inlet metal angle | 46 | 51 | 60 | 65 | 81 | 108 | 144 |
| Inlet Incl. angle | 18 | 23 | 25 | 28 | 27 | 26 | 25 |
| Exit metal angle | 32 | 30 | 28 | 26 | 22 | 21 | 21 |
| Suction surf. turning | 8 | 7 | 9 | 8 | 9 | 7 | 2 |

Figure 3:
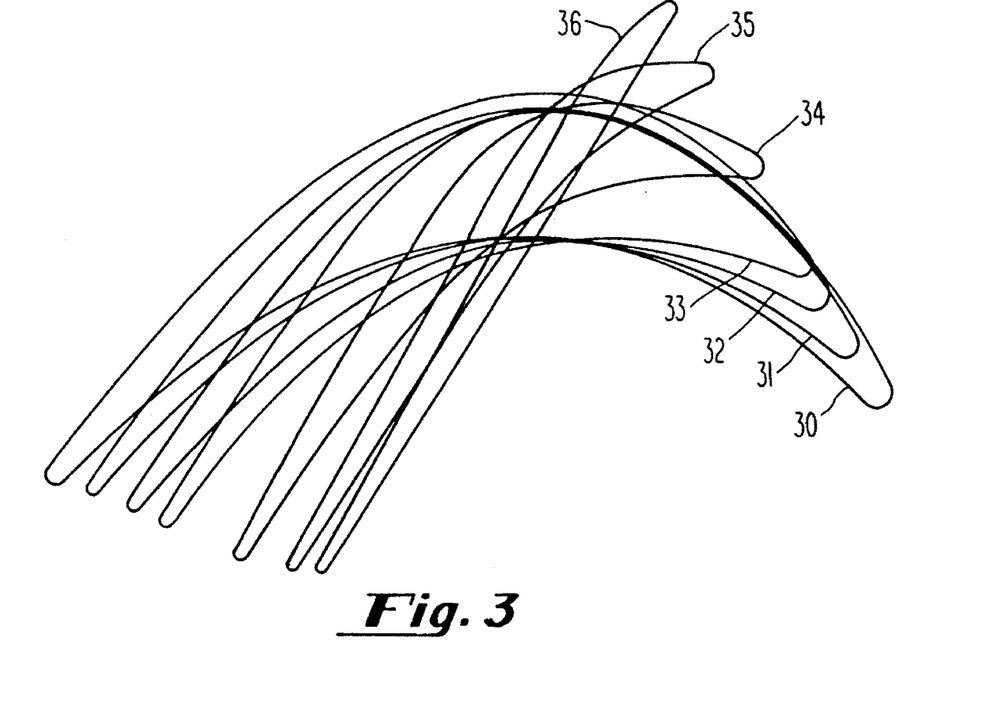
FIG. 3 is a stacked plot of transverse cross-sections through the blade shown in FIG. 1 at various radial locations.

In Table I, each parameter is specified at seven radial stations along the airfoil—specifically, (i) at 0% height (i.e., the base 15 of the airfoil 11), corresponding to a radius from the center line of the rotor 3 of 66.7 cm, (ii) at 14% height, corresponding to a radius of 71.8 cm, (iii) at 28% height, corresponding to a radius of 76.9 cm, (iv) at 38% height, corresponding to a radius of 80.4 cm, (v) at 60% height, corresponding to a radius of 88.6 cm, (vi) at 80% height, corresponding to a radius of 95.9 cm, and (vii) at 100% height (i.e., the tip 13 of the airfoil), corresponding to a radius of 103 cm. The cross-sectional shape of the airfoil 11 at each of these seven radial stations is shown in FIG. 3 and indicated by reference numerals 30–36, the cross-section designated 30 being at the base 15, the cross-section designated 31 being at 14% height, the cross-section designated 32 being at 28% height, the cross-section designated 33 being at 38% height, the cross-section designated 34 being at 60% height, the cross-section designated 35 being at 80% height, the cross-section designated 36 being at the tip.

The parameters shown in Table I are defined as follows with reference to FIG. 2. The chord of the blade is the distance from the leading edge to the trailing edge and is indicated as C in FIG. 2. The width of the blade refers to the distance from the leading to the trailing edges in the axial direction—that is, the axial component of the chord—and is indicated by W in FIG. 2. The pitch is the distance in the tangential direction between the trailing edges of adjacent blades and is indicated in FIG. 2 as P. Table I shows both the pitch/width and the pitch/cord ratios.

The stagger angle is the angle that a line 21 drawn from the leading edge portion 22 to the trailing edge portion 26 makes with the axial direction and is indicated in FIG. 2 as S. The exit opening, or throat, is the shortest distance from the trailing edge portion 26 of one blade to the suction surface 14 of the adjacent blade and is indicated in FIG. 2 by O. The gauging of the blade row is defined as the ratio of the throat to the pitch and indicates the percentage of the annular area available for steam flow. As can be seen in Table I, in the blade according to the current invention, the gauging at the base of the airfoil is relatively high.

The maximum thickness of the airfoil is shown in FIG. 2 as t.

The camber angle is indicated as CA in FIG. 2 and is defined by the angle between the leading and trailing edge portions of the airfoil. Thus, the camber angle may be expressed as by the equation $CA = 180° - (IMA + EMA)$, where IMA and EMA are the inlet and exit metal angles, respectively. The inlet metal angle is the angle formed between the circumferential direction and the line 25 that bisects the lines 19 and 20, lines 19 and 20 being the lines that are tangent with the suction surface 14 and the pressure surface 18, respectively, adjacent the leading edge portion 22. The inlet metal angle is indicated in FIG. 2 as IMA. As can be seen in Table I, in the blade according to the current invention the inlet metal angle is unusually low at the base of the airfoil.

The exit metal angle is the angle formed between the circumferential direction and the line 27 that bisects the lines 23 and 24, lines 23 and 24 being the lines that are tangent with the suction surface 14 and the pressure surface 18, respectively, at the trailing edge portion 26. The exit metal angle is indicated in FIG. 2 as EMA.

The inlet included angle is the angle between the tangent lines 19 and 20 and is indicated in FIG. 2 as IIA. The suction surface turning angle is the amount of the suction surface turning from the throat O to the trailing edge portion 26 and is indicated in FIG. 2 as STA. The optimum value for the suction surface turning angle depends on the Mach No. and is also a tradeoff since too large an amount of turning can cause flow separation and too little turning will prevent the steam flow from accelerating properly and may result in an undesirably thin trailing edge.

The mechanical properties of the blade 5 are shown in Table II. The principal coordinate axes of the airfoil are indicated in FIG. 2 as MIN and MAX. The minimum and maximum second moments of area about these axes are shown in Table II as $I_{min}$ and $I_{max}$, respectively. The radial distribution of $I_{min}$ and the cross-sectional area have a strong influence on the first vibratory mode and its resonant frequency. The radial distribution of $I_{max}$ and the cross-sectional area have a strong influence on the second vibratory mode and its resonant frequency. The angle that the principal coordinate axis MIN makes with the axial direction is indicated in FIG. 2 as PCA.

TABLE II

| | Mechanical Parameters | | | | | | |
|---|---|---|---|---|---|---|---|
| Height | 0% | 14% | 28% | 38% | 60% | 80% | 100% |
| Angle of Pric. Coor. Axes | 14 | 17 | 24 | 29 | 47 | 61 | 67 |
| Area, mm$^2$ | 1450 | 1190 | 1040 | 977 | 578 | 385 | 286 |
| Imin, mm$^4$ × 10$^3$ | 133 | 86 | 62 | 51 | 16 | 3 | 0.4 |
| Imax, mm$^4$ × 10$^4$ | 105 | 70 | 52 | 42 | 24 | 18 | 14 |

To provide optimum shape to the passages between adjacent blade airfoils 11, the blade airfoils are manufactured with a pre-twist. As is known in the art, the effect of such pre-twist is that the natural tendency of the blade airfoil to rotate as a result of centrifugal stress due to rotation is compensated for and the nominal passage shape is maintained at running speed.

Although all of the airfoils 11 of the row of blades 5 shown in FIG. 1 have the airfoil parameters shown in Tables I and II, according to an important aspect of the current invention, the blade airfoils are not identical. Specifically, the blades are manufactured, using the novel method discussed below, so that shape of each airfoil 11 falls into either of two groups. Half of the blades 5 have an airfoil shape falling within the first group and the other half of the blades have an airfoil shape falling within the second group. The shape of the airfoils in the first group of blades differs slightly from the shape of the airfoils in the second group of blades. The difference in shape is too small to affect the values of the parameters shown in Tables I and II, the differences being less than the precision with which the parameters are specified. Nor are the differences large enough to change the appearance of the airfoils, as shown in FIGS. 2 and 3, when viewed by the naked eye. Nevertheless, the difference in shape is such that the resonant frequencies of the first vibratory mode (i.e., tangential bending) of the blades in the first and second blade groups differ. Thus, the row of blades 5 are "mix-tuned." In the preferred embodiment, the blades in the first group have a mean resonant frequency in the first vibratory mode that differs by 5 Hz from the mean resonant frequency in the first vibratory mode of the blades in the second group.

At assembly, the blades 5 are sequenced circumferentially around the row so that each blade from the first group alternates with a blade from the second group. Due to the difference in resonant frequencies between the blades in the first and second groups, no two adjacent blades will vibrate at the same frequency, thereby inhibiting the onset of stall flutter, as previously discussed.

Figure 4A:
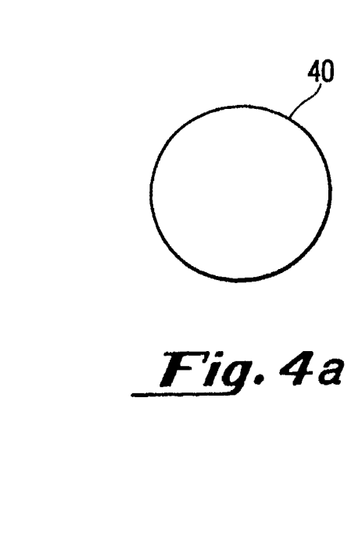
FIGS. 4(a)–(c) are a schematic diagram showing the method of manufacturing the blades shown in FIG. 1.
Figure 4B:
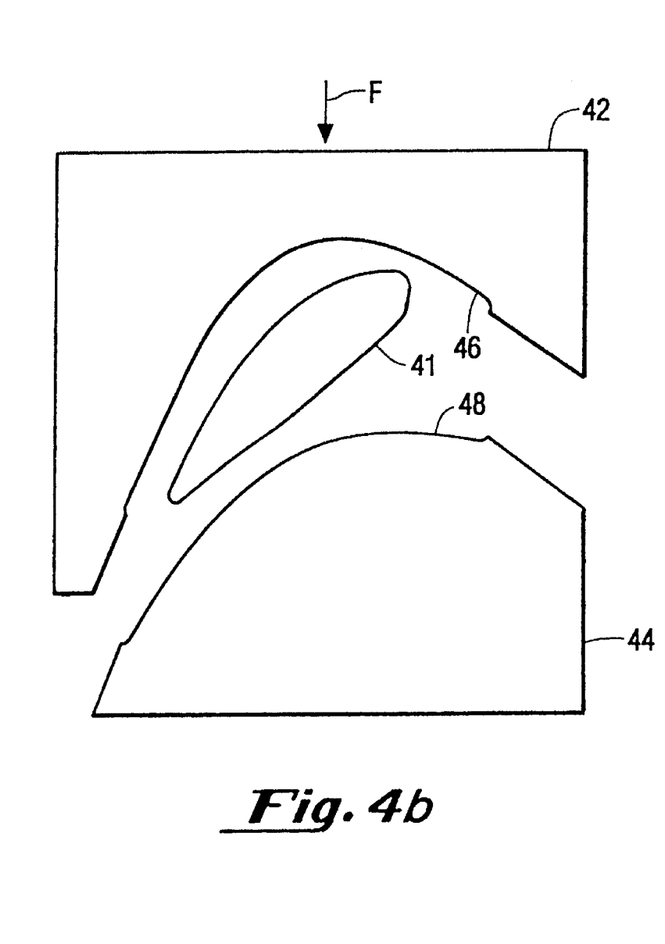
Figure 4C:
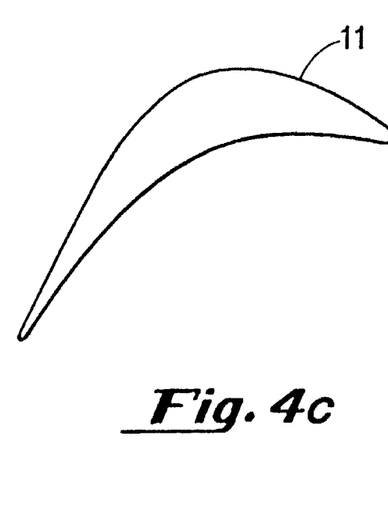

The method for making the blades 5 is shown schematically in FIG. 4(a)–(c). As shown in FIG. 4(a), the method is begun with a piece of round bar stock 40 made of a metal suitable for use in a turbine blade, such as alloy steel. The bar stock 40 is then heated, pre-formed and then forged using an intermediate die (not shown) into a forging blank 41 so that it has a somewhat flatten shape, as shown in FIG. 4(b). Finally, the heated forging blank 41 is inserted between upper and lower halves 42 and 44, respectively, of a forging die, as shown in FIG. 4(b). The upper half 42 of the forging die has a forming surface 46 that conforms to the convex suction surface 14 of the airfoil 11. The lower half 44 of the forging die has a forming surface 48 that conforms to the concave pressure surface 18 of the airfoil 11.

When the forging blank 41 has been properly positioned between the die halves 42 and 44, the upper die half is brought toward the lower die half so that the die closes. A force F applied to the upper die half 42 causes the forming surfaces 46 and 48 to deform the forging blank 41 so that it takes the shape of the airfoil 11, as shown in FIG. 4(c). According to the current invention, the upper die half 42 takes either of two paths in moving toward the lower die half 44 so that, when the die is fully closed, the upper die half assumes either one of two positions relative to the low die half.

As will be appreciated by one skilled in the art, the manufacturing procedure may involve various intermediate, as well as post forging steps, such as final machining of flashing, especially at the leading and trailing edges, and the blade root.

Figure 5:
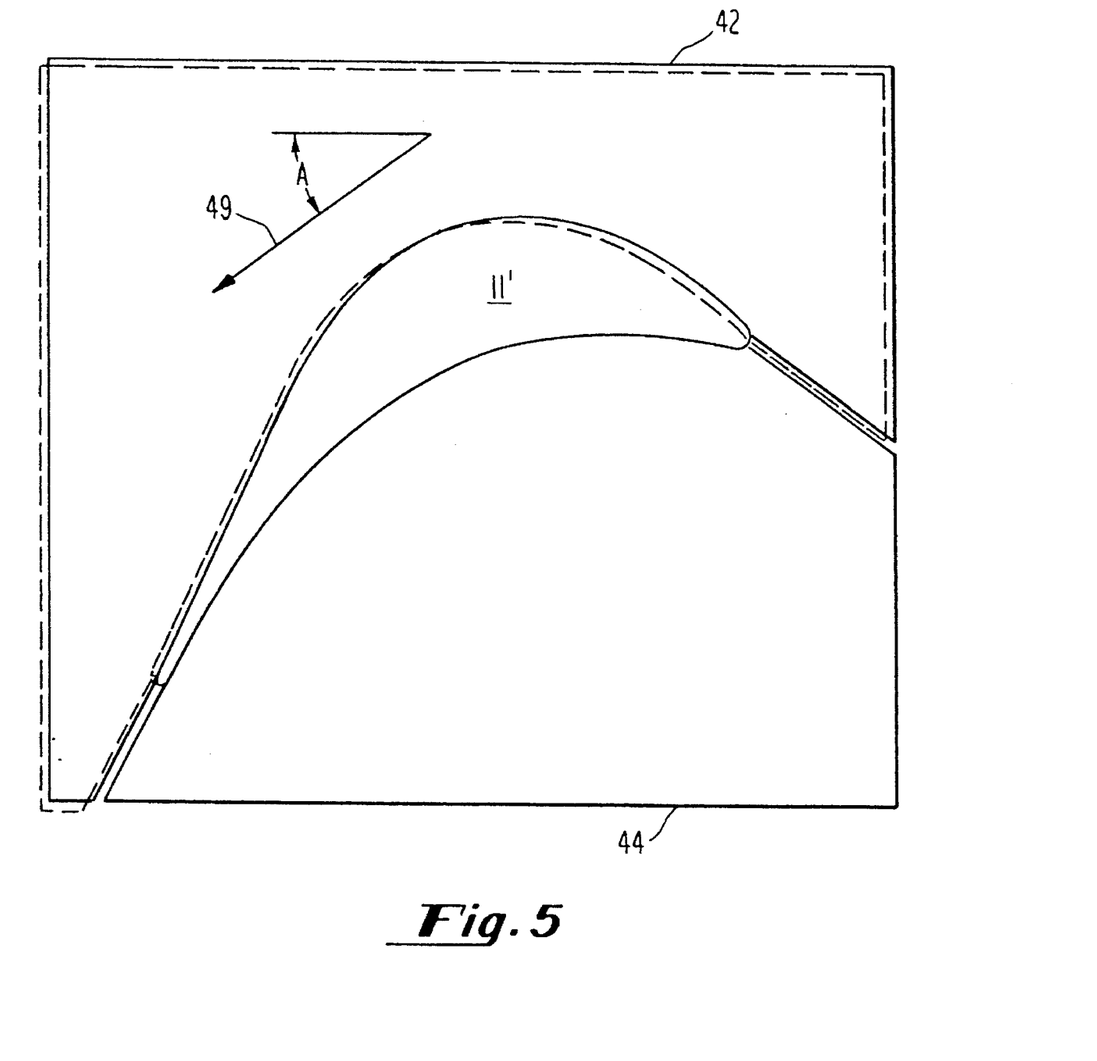
FIG. 5 is a detailed view of the closed position of the die when making a first group of the blades shown in FIG. 1.
Figure 6:
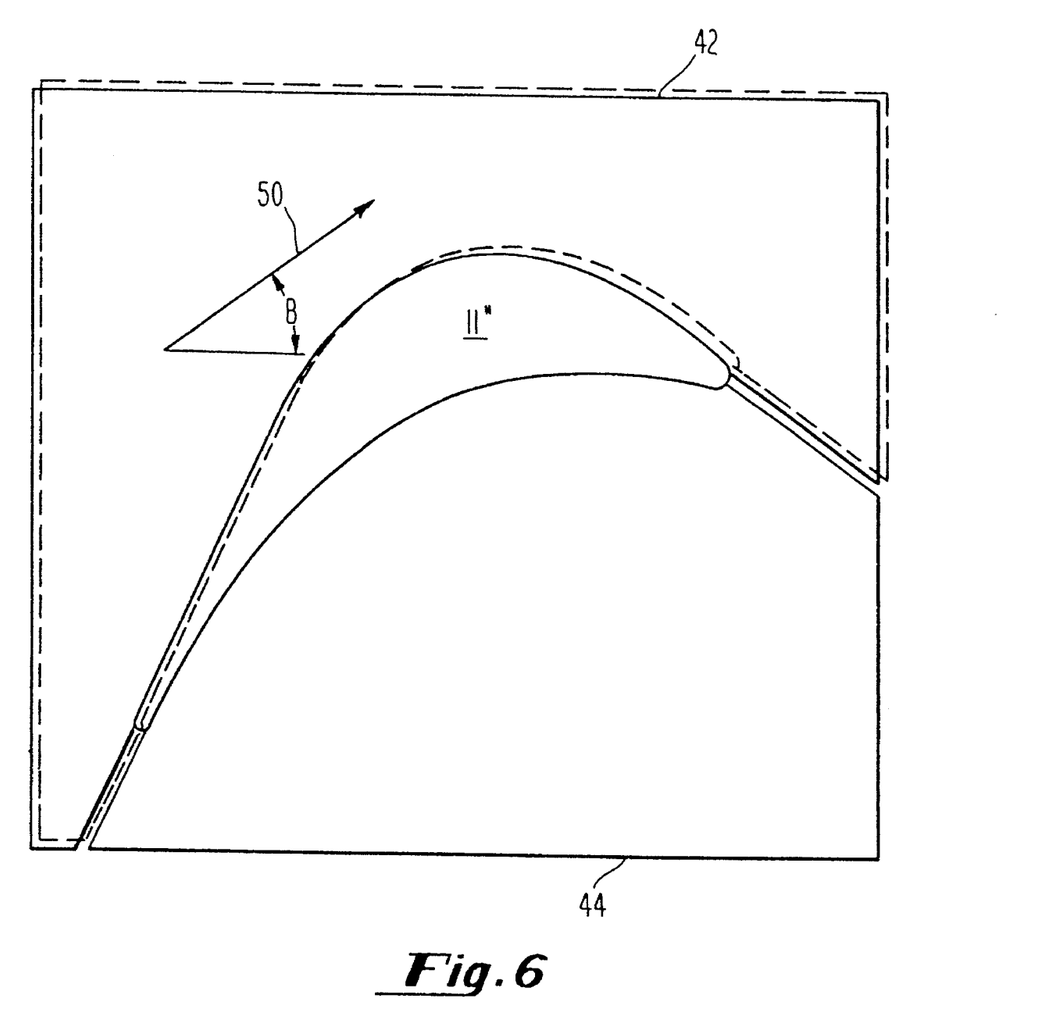
FIG. 6 is a detailed view of the closed position of the die when making a second group of the blades shown in FIG. 1.

In FIGS. 5 and 6, the "nominal" position of the upper die half 42 relative to the lower die half 44 is shown by the solid lines. In actual practice, the upper die half 42 never assumes this nominal position but consideration of the nominal position is useful for illustrating the principals of the current invention.

When making blades 5 for the first blade group, the upper die 42 travels toward the lower die 44 so that when the die fully closes it assumes a first position relative to the lower die half 44. This first is position shown by the dotted lines in FIG. 5. As can be seen, when the die is in the closed fully, the position of the upper die 42 has been offset from the "nominal" closed position in a direction 49 by a predetermined amount. It should be appreciated that the magnitude of the offset has been exaggerated in FIGS. 5 and 6 for purposes of illustration. In the preferred embodiment, the predetermined amount of the offset is approximately 0.2 mm (0.008 inch). Preferably, the direction 49 of the offset forms an angle A with the axial direction. In the preferred embodiment, the angle A is approximately equal to the average stagger angle—i.e., in the range of 30°–40°.

When making blades 5 for the second blade group, the upper die 42 travels toward the lower die 44 so that when the die fully closes it assumes a second position relative to the lower die half 44. This second is position shown by the dotted lines in FIG. 6. As can be seen, when the die is fully closed, the position of the upper die 42 has been offset from the "nominal" closed position in a direction 50 by a predetermined amount. In the preferred embodiment, the predetermined amount of the offset in direction 50 is equal to that of the offset in direction 49 so that the total offset between the first and second positions is approximately 0.4 mm (0.016 inch). The direction 50 of the offset forms an angle B with the axial direction. In the preferred embodiment, the angle B is approximately equal to the angle A so that the direction 50 is opposite to, but parallel with, the direction In FIGS. 5 and 6, the difference between the first and second positions of the upper die half 42 relative to the lower die half 44 is the result of an offset that is achieved by straight translations of the upper die half from the nominal position. However, it should be realized that the difference in position could also be accomplished by a rotation of the upper die half 42 relative to the lower die half 44. Such a rotation could be superimposed upon, or used instead of, the translation shown in FIGS. 5 and 6 to achieve the desired degree of mix-tuning.

Although the present invention has been described with reference to a steam turbine blade, the invention is also applicable to rotating blades and stationary vanes in other types of turbomachines, such as gas turbines. Accordingly, the present invention may be embodied in other specific forms without departing from the spirit or essential attributes thereof and, accordingly, reference should be made to the appended claims, rather than to the foregoing specification, as indicating the scope of the invention.

We claim:

1. A method of making a row of airfoils for use in a turbomachine, each of said airfoils having a shape, comprising the steps of:

a) forming a plurality of forging blanks;

b) disposing a first one of said forging blanks between first and second portions of a die, said first and second die portions having first and second forming surfaces thereon, respectively;

c) bringing said first die portion toward said second die portion so as to close said die, thereby forging said first forging blank disposed therebetween into a first one of said airfoils in said row, said first die portion being brought toward said second die portion so that said first die portion assumes a first orientation with respect to said second die portion when said die is closed;

d) removing said first airfoil; and e) disposing a second one of said forging blanks between said first and second portions of said die, and bringing said first die portion toward said second die portion so as to close said die, thereby forging said second forging blank disposed therebetween into a second one of said airfoils in said row, said first die portion being brought toward said second die portion so that said first die portion assumes a second orientation with respect to said second die portion when said die is closed, said first and second orientations of said first die relative to said second die differing by a predetermined amount.

2. The method according to claim 1, wherein said first and second airfoils each have a resonant frequency, said resonant frequency of said first airfoil differing from said resonant frequency of said second airfoil by a predetermined amount.

3. The method according to claim 2, wherein said predetermined amount by which said resonant frequencies of said first and second airfoils differ is at least approximately 5 Hz.

4. The method according to claim 2, wherein said resonant frequencies of said first and second airfoils is the resonant frequency of the first vibratory mode of said airfoils.

5. The method according to claim 1, wherein said predetermined amount by which said first and second orientations of said first die relative to said second die differ is at least approximately 0.4 mm.

6. The method according to claim 1, wherein said first and second orientations are displaced from each other along a direction that forms a predetermined angle with the axial direction.

7. The method according to claim 1, wherein said first and second orientations are rotated relative to each other.

8. The method according to claim 1, wherein each of said airfoils have first and second surfaces formed thereon, and wherein said first die forming surface has a shape conforming to said first surfaces of said airfoils and said second die forming surface has a shape conforming to said second surfaces of said airfoils.

9. The method according to claim 8, wherein said first surface of said airfoil is approximately convex shaped, and said second surface of said airfoil is approximately concave shaped.

10. The method according to claim 8, wherein each of said airfoils have leading and trailing edges, said first and second surfaces each extending from said leading edge to said trailing edge so as to form opposing surfaces of said airfoils, said first and second surfaces of said airfoils defining a thickness of said airfoil therebetween.

11. The method according to claim 1, wherein said row of airfoils is comprised of first and second groups of airfoils, said airfoils in said first group having a different shape than said airfoils in said second group, said first group of airfoils including said first one of said airfoils and said second group of airfoils including said second one of said airfoils, and further comprising the steps of:

a) disposing a first group of additional forging blanks one at a time between said first and second portions of said die, and bringing said first die portion toward said second die portion so as to close said die on each of said first group of forging blanks, thereby forging said first group of additional forging blanks disposed therebetween into said first group of airfoils, said first die portion being brought toward second die portion so that said first die portion assumes said first orientation with respect to said second die portion when said die is closed; and b) disposing a second group of additional forging blanks one at a time between said first and second portions of said die, and bringing said first die portion toward said second die portion so as to close said die on each of said second group of forging blanks, thereby forging said second group of additional forging blanks disposed therebetween into said second group of airfoils, said first die portion being brought toward second die portion so that said first die portion assumes said second orientation with respect to said second die portion when said die is closed.

12. The method according to claim 11, further comprising the step of sequencing said airfoils around said row so to alternate airfoils from said first group of airfoils with airfoils from said second group of airfoils, thereby mix-tuning said row of airfoils.

13. The method according to claim 1, wherein said first and second portions of said die comprise first and second halves of said die, whereby said first die half forms a first portion of said shape of said airfoils and said second die half forms the remaining portion of said shape of said airfoils.

14. A method of making a mix-tuned row of turbomachine blades including first and second groups of blades, each of said blades in said first group of blades having a first resonant frequency and each of said blades in said second group of blades having a second resonant frequency different from said first resonant frequency, each of said blades having an airfoil portion forming a surface for directing the flow of a working fluid through said turbomachine, said airfoil surface having a shape, said first and second resonant frequencies of said blades being a function of said shape of said airfoil in said respective blade group, the method comprising the steps of:

a) forming a plurality of forging blanks;
   b) disposing each of said forging blanks between first and second halves of a die, said first and second dies halves having first and second forming surfaces, respectively, thereon that together conform to said surfaces of said blade airfoils, whereby said shape of said airfoil surfaces is dependent upon the relative position between said first and second die halves when said die is closed; and
   c) forging each of said airfoil portions of said blades in said row by bringing said first die portion toward said second die portion so as to close said die on one of said forging blanks, removing each of said airfoil portions after said forging step, said die being closed so that said first die half assumes a first position relative to said second die half when forming said airfoil portions of said blades in said first group of blades, and said die being closed so that said first die half assumes a second position relative to said second die half when forming said airfoil portions of said blades in said second group of blades, said first position being offset from said second position by a predetermined amount, whereby said first and second resonant frequencies are not equal.

15. The method according to claim 14, wherein said predetermined amount of said offset is such that said first and second resonant frequencies differ by at least about 5 Hz.

16. The method according to claim 15, wherein said predetermined amount of said offset between said first and second positions is at least approximately 0.4 mm.

17. The method according to claim 14, wherein each of said airfoils of said blades in each of said blade groups:

a) has a base portion and a tip portion defining an airfoil height therebetween;
   b) has transverse sections disposed radially outward from said base by distances equal to 0%, 14%, 28%, 38%, 60%, 80% and 100%, respectively, of said height of said airfoil; and
   b) is defined by the following parameters having approximately the values indicated below, all angles being expressed in degrees:

| Height | 0% | 14% | 28% | 38% | 60% | 80% | 100% |
| --- | --- | --- | --- | --- | --- | --- | --- |
| Radius, cm | 66.7 | 71.8 | 76.9 | 80.4 | 88.6 | 95.9 | 103 |
| Chord, cm | 11.1 | 10.3 | 9.6 | 9.1 | 8.5 | 8.4 | 8.5 |
| Pitch/width | 0.4 | 0.5 | 0.6 | 0.7 | 1.0 | 1.4 | 2.1 |
| Pitch/cord | 0.4 | 0.5 | 0.6 | 0.6 | 0.7 | 0.8 | 0.8 |
| Stagger angle | 14 | 19 | 25 | 30 | 45 | 58 | 66 |
| Gauging | 0.5 | 0.5 | 0.4 | 0.4 | 0.4 | 0.3 | 0.3 |
| Max. thk., mm | 18 | 16 | 16 | 17 | 11 | 8 | 5 |
| Camber angle | 102 | 99 | 92 | 89 | 77 | 52 | 15 |
| Inlet metal angle | 46 | 51 | 60 | 65 | 81 | 108 | 144 |
| Inlet Incl. angle | 18 | 23 | 25 | 28 | 27 | 26 | 25 |
| Exit metal angle | 32 | 30 | 28 | 26 | 22 | 21 | 21 |
| Suction surf. turning | 8 | 7 | 9 | 8 | 9 | 7 | 2 |

18. The method according to claim 17, wherein the difference between said first and second resonant frequencies is approximately 5 Hz.

* * * * *